United States Patent
David et al.

(10) Patent No.: US 10,215,590 B2
(45) Date of Patent: Feb. 26, 2019

(54) MAGNETIC FIELD SENSOR FOR SENSING A PROXIMITY AND/OR A LOCATION OF AN OBJECT

(71) Applicant: Allegro MicroSystems, LLC, Manchester, NH (US)

(72) Inventors: Paul A. David, Bow, NH (US); Ravi Vig, Bow, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/176,668

(22) Filed: Jun. 8, 2016

(65) Prior Publication Data
US 2017/0356762 A1    Dec. 14, 2017

(51) Int. Cl.
*G01D 5/14* (2006.01)
*G01D 5/16* (2006.01)
(Continued)

(52) U.S. Cl.
CPC .......... *G01D 5/142* (2013.01); *G01B 7/023* (2013.01); *G01D 5/147* (2013.01); *G01D 5/16* (2013.01); *G01P 3/488* (2013.01)

(58) Field of Classification Search
CPC ...... G01R 33/07; G01R 33/077; G01R 33/09; G01R 33/072; G01R 33/02; G01R 33/10; G01R 33/0029; G01R 33/0005; G01R 33/0017; G01R 33/0023; G01R 33/0041; G01R 33/0052; G01R 33/022; G01R 33/025; G01R 33/091; G01R 33/096; G01D 5/142; G01D 5/145; G01D 5/147; G01D 5/14; G01D 5/16; G01D 5/165; G01D 5/1655; G01D 5/2451; G01D 5/24476; G01D 5/2448; G01D 18/008; G01D 3/036;
(Continued)

(56) References Cited

U.S. PATENT DOCUMENTS

| 4,053,829 A | 10/1977 | Maruo |
| 4,481,469 A | 11/1984 | Hauler et al. |

(Continued)

FOREIGN PATENT DOCUMENTS

| DE | 10 2004017191 A1 | 10/2005 |
| EP | 2 000 813 A1 | 12/2008 |

(Continued)

OTHER PUBLICATIONS

PCT International Search Report and Written Opinion dated Jul. 20, 2017 for PCT/US2017/033526; 17 pages.
(Continued)

*Primary Examiner* — Lee Rodak
(74) *Attorney, Agent, or Firm* — Daly, Crowley, Mofford & Durkee, LLP

(57) ABSTRACT

A back-biased magnetic field sensor can have one or more vertical Hall effect elements arranged within a substrate region of a substrate, wherein magnetic fields are oriented substantially vertical to the substrate within the substrate region when a ferromagnetic object is not proximate. When the ferromagnetic object becomes proximate, the magnetic field sensor can sense at least the proximity, and, in some embodiments, can also localize a position of the ferromagnetic object relative to the magnetic field sensor.

31 Claims, 10 Drawing Sheets

(51) Int. Cl.
*G01P 3/488* (2006.01)
*G01B 7/02* (2006.01)

(58) Field of Classification Search
CPC .... G01D 5/2046; G01D 5/244; G01D 5/2449; G01D 5/249; G01D 5/2515; G01P 3/488; G01P 3/487; G01P 13/04; G01P 13/045; G01P 15/105; G01P 15/11; G01P 15/18; G01P 3/4802; G01P 3/4815; G01P 3/486
USPC ............ 324/207.11, 207.24, 207.25, 207.26, 324/207.2, 207.21, 207.22, 3, 207.23
See application file for complete search history.

(56) References Cited

U.S. PATENT DOCUMENTS

| | | | | |
|---|---|---|---|---|
| 5,045,920 | A * | 9/1991 | Vig | G01V 3/08 257/414 |
| 5,304,926 | A | 4/1994 | Wu | |
| 5,896,030 | A | 4/1999 | Hasken | |
| 6,064,198 | A | 5/2000 | Wolf et al. | |
| 6,278,269 | B1 | 8/2001 | Vig et al. | |
| 6,525,531 | B2 | 2/2003 | Forrest et al. | |
| 6,956,366 | B2 | 10/2005 | Butzmann | |
| 7,253,614 | B2 | 8/2007 | Forrest et al. | |
| 7,368,904 | B2 | 5/2008 | Scheller et al. | |
| 7,772,838 | B2 | 8/2010 | Bailey et al. | |
| 7,915,886 | B2 * | 3/2011 | Stolfus | G01P 13/045 324/165 |
| 8,203,329 | B2 * | 6/2012 | Hohe | G01R 33/0017 324/202 |
| 8,729,890 | B2 | 5/2014 | Donovan et al. | |
| 2002/0144418 | A1 * | 10/2002 | Endo | G01C 9/06 33/366.24 |
| 2003/0024314 | A1 * | 2/2003 | Akieda | G01P 15/18 73/514.31 |
| 2005/0258820 | A1 | 11/2005 | Forster | |
| 2005/0280411 | A1 * | 12/2005 | Bicking | G01B 7/14 324/207.21 |
| 2008/0116884 | A1 | 5/2008 | Rettig et al. | |
| 2012/0249133 | A1 * | 10/2012 | Friedrich | G01R 33/0005 324/247 |
| 2014/0347044 | A1 | 11/2014 | Monreal et al. | |
| 2015/0022186 | A1 * | 1/2015 | Ausserlechner | G01D 5/145 324/207.2 |
| 2015/0346280 | A1 | 12/2015 | Ausserllechner | |
| 2015/0346289 | A1 | 12/2015 | Ausserlechner | |
| 2015/0354985 | A1 | 12/2015 | Judkins, III et al. | |
| 2015/0377648 | A1 * | 12/2015 | Sirohiwala | G01D 5/145 324/207.2 |
| 2016/0011281 | A1 | 1/2016 | Sander et al. | |
| 2016/0123771 | A1 | 5/2016 | David et al. | |
| 2016/0123774 | A1 | 5/2016 | Foletto et al. | |

FOREIGN PATENT DOCUMENTS

| | | |
|---|---|---|
| JP | 2011/086479 | 4/2011 |
| WO | WO 94/08203 | 4/1994 |
| WO | WO 2008/145662 A1 | 12/2008 |

OTHER PUBLICATIONS

Non-Final Office Action dated Oct. 20, 2017 for U.S. Appi. No. 15/176,645; 24 pages.
PCT International Search Report and Written Opinion dated Jul. 20, 2017 for PCT Appl. No. PCT/US2017/033530; 15 pages.
Notice of Allowance dated Apr. 4, 2018 for U.S. Appl. No. 15/176,645; 11 pages.
Response to Office Action filed Jan. 19, 2018 for U.S. Appl. No. 15/176,645; 25 pages.

* cited by examiner

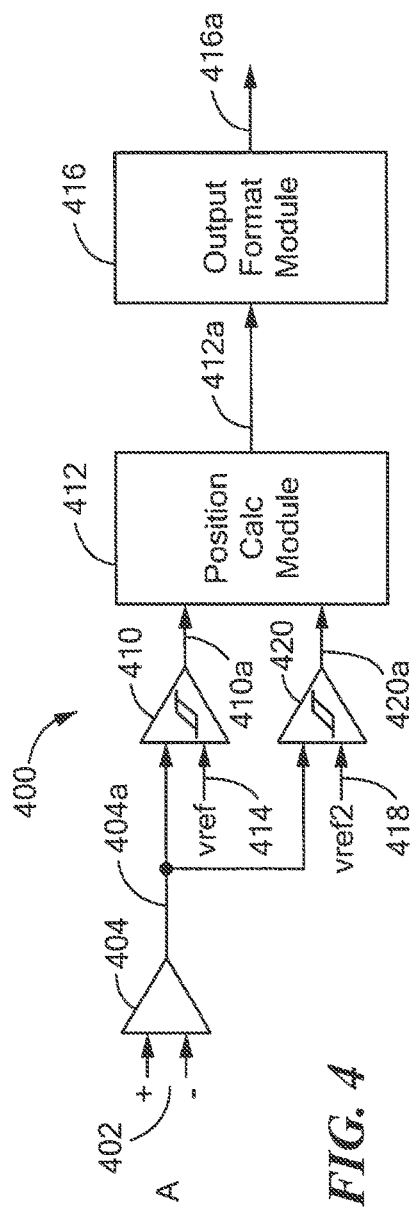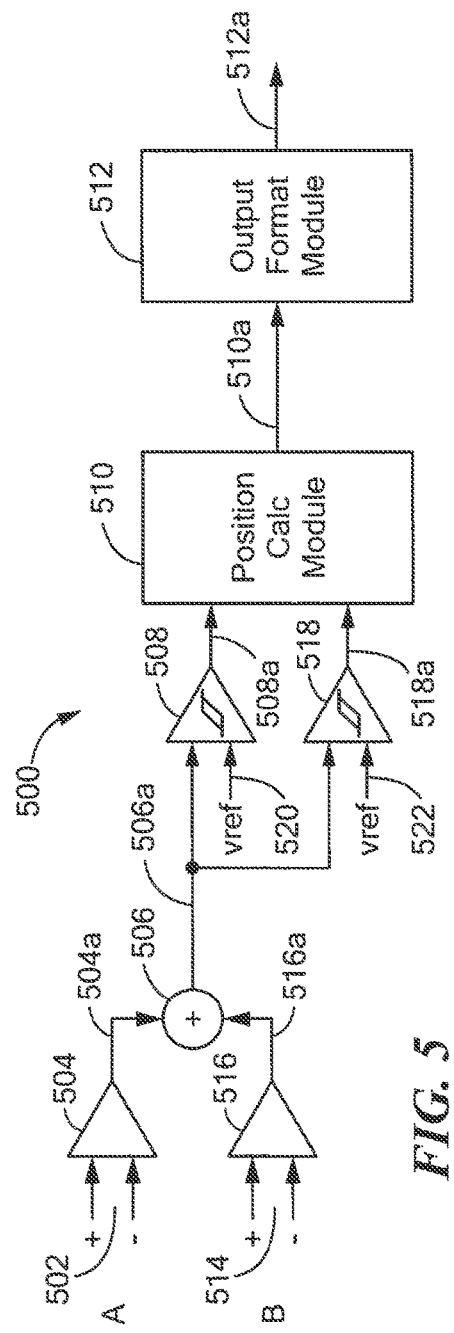
FIG. 4
FIG. 5

MAGNETIC FIELD SENSOR FOR SENSING A PROXIMITY AND/OR A LOCATION OF AN OBJECT

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors and, more particularly, to a back-biased magnetic field sensor that can sense both a proximity and/or a location of a ferromagnetic object.

BACKGROUND

Various types of magnetic field sensing elements are known, including Hall Effect elements and magnetoresistance elements. Magnetic field sensors generally include a magnetic field sensing element and other electronic components. Some magnetic field sensors also include a permanent magnet in a so-called "back biased" arrangement described more fully below.

Magnetic field sensors provide an electrical signal representative of a sensed magnetic field, e.g., a magnitude of the sensed magnetic field. In some embodiments that have the magnet in a back-biased arrangement, a magnetic field sensed by a magnetic field sensor is a magnetic field generated primarily by the magnet. In these back-biased arrangements, in the presence of a ferromagnetic object, the magnetic field generated by the magnet and sensed by the magnetic field sensor varies in accordance with proximity of the ferromagnetic object to the magnetic field sensor.

In some arrangements, the output signal from the magnetic field sensor is a "non-linear" two state signal having a first state indicative of a ferromagnetic object being distal from the magnetic field sensor and a second different state indicative of the ferromagnetic object being proximate to the magnetic field sensor. In other arrangements, the output signal from the magnetic field sensor is a "linear" (analog or digital) signal having a signal value indicative of a distance between the ferromagnetic object and the magnetic field sensor. A magnetic field sensor having either of the above signal characteristics can be referred to as a "proximity sensor."

Conventional back-biased proximity sensors are able to sense a proximity of a ferromagnetic object (i.e., distance between the back biased proximity sensor and the ferromagnetic object) but are not able to identify a location of the ferromagnetic object, for example, a location in an x-y plane of the back-biased proximity sensor, for example, where the ferromagnetic object approaches the magnetic field sensor in a z direction.

It would be desirable to provide a back-biased proximity sensor that it able to sense not only a proximity of a ferromagnetic object (i.e., distance between the back biased proximity sensor and the ferromagnetic object) but is also able to identify a location of the ferromagnetic object, for example, a location in an x-y plane of the back-biased proximity sensor, for example, where the ferromagnetic object approaches the magnetic field sensor in a z direction.

Conventional back-biased proximity sensors typically use a single ended configuration with one magnetic field sensing element, typically a planar Hall effect element, with a maximum response axis that intersects the ferromagnetic object. In other back-biased arrangements, two or more magnetic field sensing elements are used and a difference signal is generated from the two or magnetic field sensing elements. The difference signal is representative of an edge of a feature (e.g., gear tooth) of the ferromagnetic object.

It would be desirable to provide a back-biased proximity sensor that uses a different type of magnetic field sensing element, different than a planar Hall effect element, and with a maximum response axis that does not intersect the ferromagnetic object.

It is known that differential arrangements can offer advantages not found in conventional back-biased proximity sensors. For example, in general, a differential arrangement that uses two magnetic field sensing elements can be non-responsive to undesirable external magnetic fields that are equally received by the two magnetic field sensing elements. The differential arrangement provides common mode rejection.

A differential arrangement using two planar Hall effect elements would not function properly as a proximity sensor, because both of the two planar Hall effect elements would respond in the same way to a proximate ferromagnetic object and a resulting differential combination would have no output.

SUMMARY

The present invention provides a back-biased proximity sensor that it able to sense not only a proximity of a ferromagnetic object (i.e., distance between the back biased proximity sensor and the ferromagnetic object) but is also able to identify a location of the ferromagnetic object, for example, a location in an x-y plane of the back-biased proximity sensor, for example, where the ferromagnetic object approaches the magnetic field sensor in a z direction.

The present invention can provide a back-biased proximity sensor that uses a different type of magnetic field sensing element, different than a planar Hall effect element, and with a maximum response axis that does not intersect the ferromagnetic object In accordance with an example useful for understanding an aspect of the present invention, a magnetic field sensor for sensing a movement of a ferromagnetic object along a path, a movement line tangent to the path, the magnetic field sensor comprises:

a magnet;

a semiconductor substrate proximate to the magnet and at a position between the ferromagnetic object and the magnet, the semiconductor substrate comprising:

first and second substrate axes on the first opposing surface of the substrate intersecting at a substrate axes point, the first and second substrate axes describing four half planes and four planar portions in a plane of the substrate axes, wherein a first two of the four half planes are on opposite sides of the first substrate axis and a second two of the four half planes are on opposite sides of the second substrate axis; and a substrate region upon the first opposing surface of the substrate, the substrate region proximate to and surrounding the substrate axes point, wherein magnetic fields generated by the magnet at the substrate region are substantially perpendicular to the semiconductor substrate in the absence of the ferromagnetic object, the magnetic field sensor further comprising:

a first magnetic field sensing element disposed on or under the first surface of the semiconductor substrate and disposed within the substrate region, wherein the first magnetic field sensing element comprises an axis of maximum sensitivity substantially parallel to the first substrate axis, wherein a center of the first magnetic field sensing element is disposed along the second substrate axis.

BRIEF DESCRIPTION OF THE DRAWINGS

The foregoing features of the invention, as well as the invention itself may be more fully understood from the following detailed description of the drawings, in which:

FIG. 4 is a block diagram showing further details of an example of the electronic circuit of the back-biased proximity sensor FIG. 3 when the back-biased proximity sensor uses one vertical Hall effect element;

FIG. 5 is a block diagram showing further details of an example of the electronic circuit of the back-biased proximity sensor FIG. 3 when the back-biased proximity sensor uses two vertical Hall effect elements;

DETAILED DESCRIPTION

Figure 1:
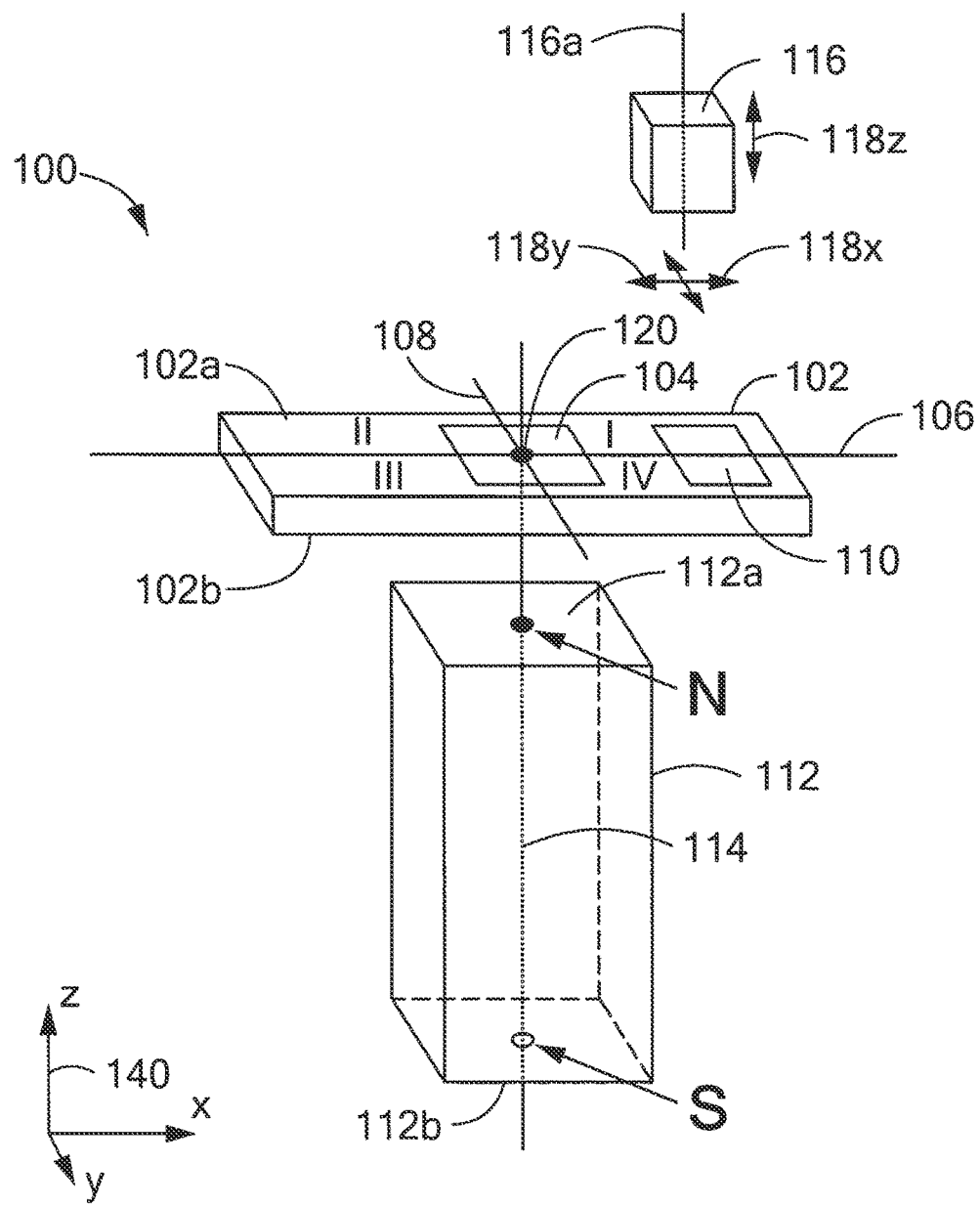
FIG. 1 is a block diagram showing a back-biased magnetic field sensor having a substrate region of a substrate, the substrate regions described more particularly below, inside of which one or more magnetic field sensing elements are disposed, and an associated electronic circuit, all disposed upon the electronic substrate, along with a back-biasing magnet, the back-biased proximity sensor for sensing a ferromagnetic object.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a compound semiconductor material like Gallium-Arsenide (GaAs) or an Indium compound, e.g., Indium-Antimonide (InSb), or InGaA.

As is known, some of the above-described magnetic field sensing elements tend to have an axis of maximum sensitivity substantially parallel to a substrate that supports the magnetic field sensing element, and others of the above-described magnetic field sensing elements tend to have an axis of maximum sensitivity substantially perpendicular to a substrate that supports the magnetic field sensing element. In particular, planar Hall elements tend to have axes of sensitivity substantially perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuit shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of analog comparator having a two state output signal indicative of an input signal being above or below a threshold level. However the comparator can also be comprised of a digital circuit having an output signal with at least two states indicative of an input signal being above or below a threshold level.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "active electronic component" is used to describe an electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

The terms "parallel" and "perpendicular" may be used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

Planar and vertical Hall effect elements and also magnetoresistance elements are described herein as coupled to examples of electronic circuits. For the planar and vertical Hall effect elements, while not explicitly shown, current spinning (also referred to as chopping) techniques can be used along with associated circuit elements that are not shown in the figures. Current spinning can be used to reduce a DC offset error (non-zero signal when in the presence of a zero magnetic field) otherwise present in an output signal directly from a planar or vertical Hall effect element.

Current spinning will be understood to be a known technique with known electronic circuit elements that can, at a first coupling "phase," couple a drive current to drive a current between particular selected drive terminals of a planar or vertical Hall effect element. At the first coupling phase, a differential output signal can be generated between two other terminals of the planar or vertical Hall effect element that are not used as the drive terminals of the first coupling phase. Sequentially, at a second coupling phase, the known electronic circuit elements can couple the drive current to drive a current between other particular selected terminals of the planar or vertical Hall effect element. At the second coupling phase, a differential output signal can be generated between two other terminals of the planar or vertical Hall effect element that are not used as the drive terminals of the second coupling phase. There can be more than two such coupling phases, for example, four coupling phases. The sequential output signals can be averaged to result in a lower effective offset voltage.

Referring now to FIG. 1, a back-biased proximity sensor 100 is shown proximate to a ferromagnetic object 116, but does not include the ferromagnetic object 116.

The back-biased proximity sensor 100 can include a substrate 102, for example, a semiconductor substrate, having first and second major surfaces 102a, 102b. The substrate 102 can include a substrate region 104. The substrate 102 can include one or more magnetic field sensing elements (not shown) disposed on or under the first surface 102a and inside of the substrate region 104.

The substrate region 104 is shown to be square. However, in other embodiments, the substrate region 104 can be rectangular, oval, round, or any other planar shape defined by characteristics below.

An electronic circuit 110 can be disposed in or on the first surface 102a and can be coupled to the magnetic field sensing element(s).

The back-biased proximity sensor 100 can include a magnet 112 having first and second opposing surfaced 112a, 112b, respectively. A north pole, N, can be disposed upon the first surface 112a and a south pole, S, can be disposed upon the second surface 112b. In some embodiments, the north pole, N, and the south pole, S, are reversed in position.

A magnet axis 114 passes through the north and south poles.

Upon the first surface 102a of the substrate 102, first and second orthogonal exes 106, 108, respectively, intersect the at a coordinate axis point 120. The coordinate axis point 120 can be at a geometric center the coordinate axis region 104.

In some embodiments, the magnetic axis 114 can intersect the coordinate axis point 120. However, more generally, the substrate region 104 is a region in which magnetic fields generated by the magnet 112 can be, in some embodiments, substantially perpendicular to the first surface 102a of the substrate 102. Further, outside of the substrate region 104, magnetic fields are not substantially perpendicular to the surface 102a.

In general, in some embodiments, the substrate region 104 has a size and a shape, and the magnet 112 also has a size and shape, selected to provide that, when the ferromagnetic object 116 is not present, within the substrate region 104, the magnetic fields at the surface 102a of the substrate 102 are within about five degrees of perpendicular to the surface 102a, and outside of the substrate region 104, the magnetic fields are beyond about five degrees. However, the substrate region 104, and the magnet 112, can have other sizes and shapes to result in magnetic field lines with other angles within and outside of the substrate region, for example, within the substrate region 104 within less than about two degrees, within less than about five degrees, less than about ten, within less than about fifteen, within less than about twenty, within less than about twenty-five, within less than about thirty, within less than about thirty-five forty, or within less than about forty-five degrees. Thus, outside of the substrate region 104, angles of magnetic field lines are greater than or equal to the above-described angles. A preferred magnetic field angle is zero or near zero.

The back-biased proximity sensor 100 can be used to sense the ferromagnetic object 116 at different positions along directions 118z, 118x, 118z (see also Cartesian coordinates 140). In some embodiments, the ferromagnetic object 116 can have a central axis 116a in a direction of a z-axis (see and the Cartesian coordinates 140) and the central axis 116a can intersect the coordinate axis point 120. However, the central axis 116a can intersect the substrate 102 anywhere within first, second, third, and fourth planar portions, here shown to be quadrants (I, II III, IV). The direction 118x, 118y, 118z can be tangent to a movement line, which may or may not be a straight movement line. In some embodiments, the direction 118x, 118y, 118z is perpendicular to the first surface 102a of the substrate 102, i.e., in a direction of the z-axis. However, other angles are also possible.

The Cartesian coordinates 140 are consistent among the various figures below, in which the surface 102a of the substrate is in an x-y plane.

Quadrants I, II, III, IV are indicative of quadrants defined by the first and second axes 106, 108.

While quadrants are used in figures and descriptions herein, in other embodiments, the first and second axes 106, 108 (and other similar axes in other figures) are not orthogonal. In these embodiments, the labels I, II, III, IV are indicative of so-called "planar portions." As used herein, the term "planar portion" applies to both four quadrants defined by two axes 106, 108 (and other similar axes in other figures) that are orthogonal, and also to four planar portions defined by two axes 106, 108 (and other similar axes in other figures) that are not orthogonal. Quadrants are used in descriptions herein for clarity.

Within the substrate region 104, magnetic fields at magnetic field sensing elements within the substrate region 104 can be substantially perpendicular to the surface 102a of the substrate 102 when the ferromagnetic object 116 is not present.

While the first surface 102a can be toward the ferromagnetic object 116 as shown, in other embodiments, the first surface 102a can be toward the magnet 112.

Figure 2:
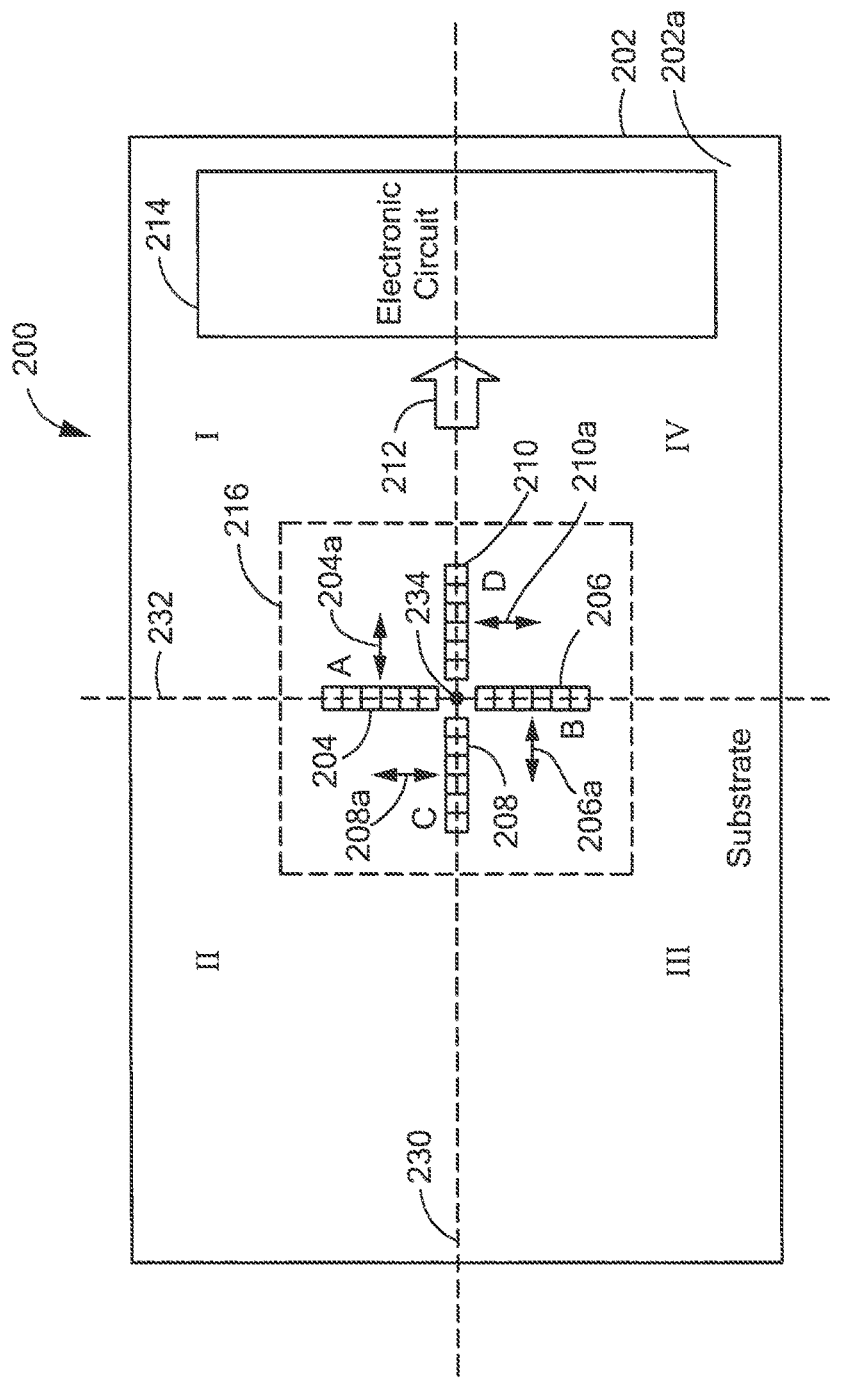
FIG. 2 is a block diagram showing a top view of an example of a substrate of the back-biased proximity sensor of FIG. 1 and having four magnetic field sensing elements shown as vertical Hall effect elements, all disposed inside of the above-mentioned substrate region, and having an electronic circuit.

Referring now to FIG. 2, a substrate 202 with a first surface 202a can be the same as or similar to the substrate 102 with the first surface 102a of FIG. 1. A substrate region 216 with a coordinate axis point 234 can be the same as or similar to the substrate region 104 with the coordinate axis point 120 of FIG. 1. An electronic circuit 214 can be the same as or similar to the electronic circuit 110 of FIG. 1. A first coordinate axis 230 and a second coordinate axis 232 can be the same as or similar to first and second coordinate axes 106, 108, respectively, of FIG. 1.

Quadrants I, II, III, IV are indicative of quadrants defined by the first and second coordinate axes 230, 232 and are the same as or similar to the quadrants I, II, III, IV of FIG. 1.

The first and second coordinate axes can have any angle relative to the substrate 202.

First, second, third and fourth vertical Hall elements 204, 206, 208, 210 can be disposed on, in, or over the first surface 202a of the substrate 202 and within the substrate region 216. Maximum response axes 204a, 206a of the first and second vertical Hall effect elements 204, 206, respectively, can be generally aligned with the first coordinate axis 230. Maximum response axes 208a, 210a of the third and fourth vertical Hall effect elements 208, 210, respectively, can be generally aligned with the second coordinate axis 232.

Cartesian coordinates 240 show that the first surface 202a of the substrate 202 can be in the same x-y plane identified in FIG. 1.

While four vertical Hall effect elements are shown, in other embodiments, there can be one, two, three, four, or more vertical Hall elements. Also, while the maximum response axes 204a, 206a, 208a, 210a of the magnetic field sensing elements 204, 206, 208, 210, respectively, are shown to be aligned with first and second coordinate axes 230, 232, respectively, in other embodiments, the maximum response axes can be at other positions.

For embodiments that use one vertical Hall effect element, the one vertical Hall effect element can be any one of the four vertical Hall effect elements. The one vertical Hall effect element can also be at another position within the substrate region 216, for example, at a center of the substrate region 216.

For embodiments that use two vertical Hall effect elements, the two vertical Hall effect elements can be any two of the four vertical Hall effect elements. The two vertical Hall effect elements can also be at other positions within the substrate region 216.

For embodiments that use three vertical Hall effect elements, the three vertical Hall effect elements can be any three of the four vertical Hall effect elements. The three vertical Hall effect elements can also be at other positions within the substrate region 216.

In other embodiments, the three vertical Hall elements can be physically arranged in a triangle.

In other embodiments, the four vertical Hall elements 204, 206, 208, 210 can be physically arranged in a square pattern (see, e.g., FIG. 9) rather than in an orthogonal cross pattern.

In general, it will be understood that having more than one vertical Hall effect element has advantages. For example, a signal to noise ratio can be improved by using more than one vertical Hall effect element.

Figure 3:
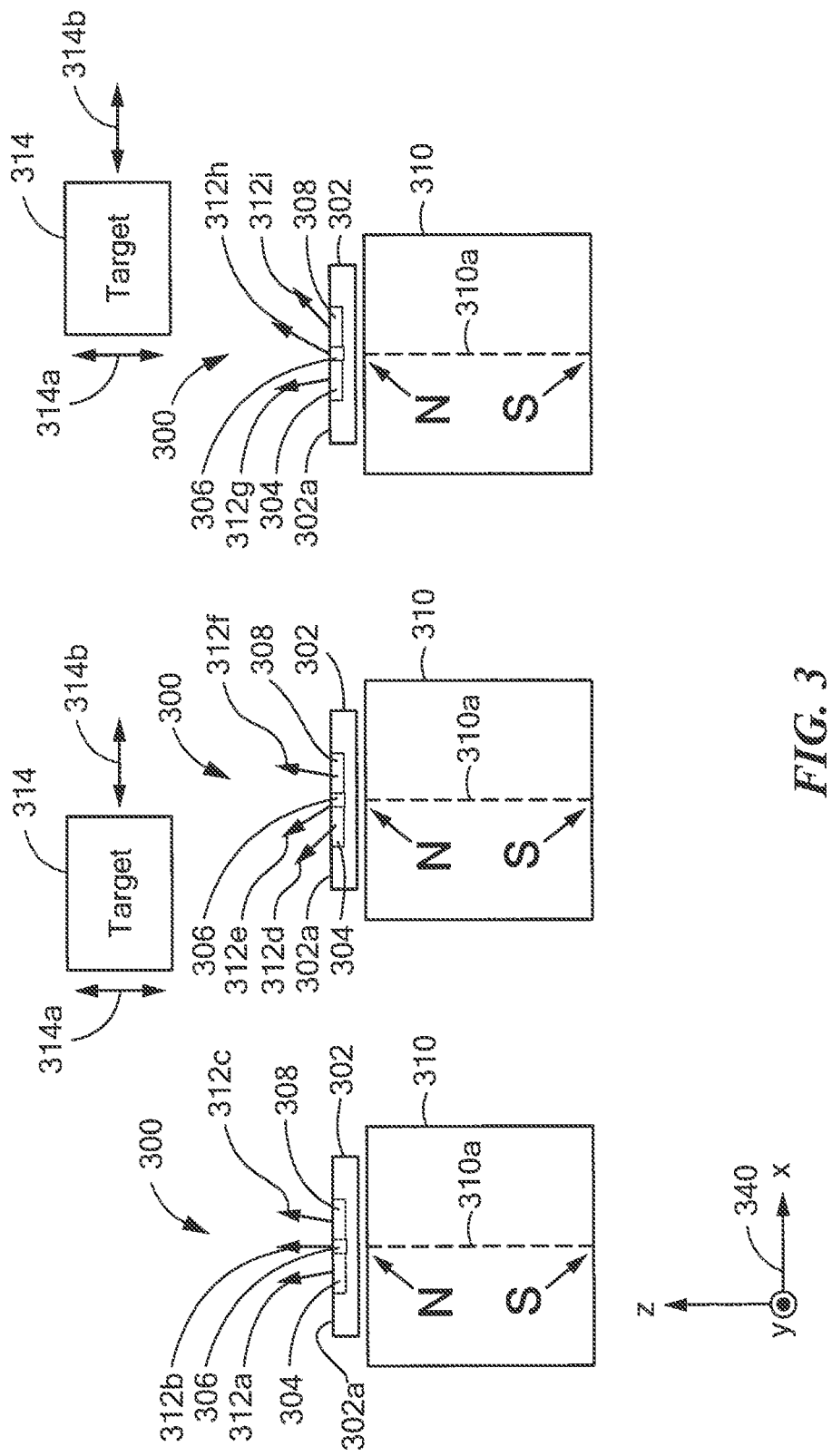
FIG. 3 is a block diagram showing a side view of a back-biased proximity sensor according to the back-biased proximity sensor of FIGS. 1 and 2 and showing different magnetic field line directions when in the presence of no ferromagnetic object and when the ferromagnetic object is closer to the back-biased proximity sensor at two different positions.

Referring now to FIG. 3, a back-biased magnetic field sensor 300 is shown in three views as a ferromagnetic object 314 approaches in a direction 314a parallel to a z axis of Cartesian coordinates 340 and also moves in a direction 314b parallel to an x (and/or y) axis.

The back-biased magnetic field sensor 300 can be the same as or similar to the magnetic field sensor 100 of FIG. 1. The back-biased magnetic field sensor 300 can include a magnet 310 with a magnet axis 310a, which can be the same as or similar to the magnet 112 with the magnet axis 114 of FIG. 1. The back-biased magnetic field sensor 300 can include a substrate 302 with a first surface 302a, which can be the same as or similar to the substrate 102 with the first surface 102a of FIG. 1.

Third, second, and fourth vertical Hall effect elements 304, 306, 308 can be the same as or similar to the third, second, and fourth vertical Hall effect elements 208, 206, 210 of FIG. 2. A first vertical Hall effect element comparable to the first vertical Hall effect element 204 is not shown, for clarity.

In a left hand view, no ferromagnetic object (e.g., 314) is proximate to the back-biased magnetic field sensor 300. Magnetic field line 312a is representative of a magnetic field direction at the third vertical Hall effect element 304, and is only slightly tilted (e.g., substantially perpendicular) in a negative x direction in an x-z plane in Cartesian coordinates 340. Magnetic field line 312b is representative of a magnetic field direction at the second vertical Hall effect element 306, and is only slightly tilted (e.g., substantially perpendicular) in a positive y direction in a y-z plane in Cartesian coordinates 340. Magnetic field line 312c is representative of a magnetic field direction at the fourth vertical Hall effect element 308, and is only slightly tilted (e.g., substantially perpendicular) in a positive x direction in the x-z plane in Cartesian coordinates 340.

Due to the directions of the maximum response axes 208a, 206a, 210a of FIG. 2 of the third, second, and fourth vertical Hall effect elements 208, 206, 210, it should be recognized that the third, second, and fourth vertical Hall effect elements 304, 306, 308 of FIG. 3 have output signals that are nearly zero, since they have maximum response axes that are in the x-y plane, and since projections of the magnetic field lines 312a, 312b, 312c upon respective maximum response axes in the x-y plane to which the vertical Hall elements are sensitive (see, e.g., FIG. 2) are nearly zero.

In the second and third panels of FIG. 3, as the ferromagnetic object 314 approaches at one side and then at other side of the centerline 310a of the magnet 310, magnetic field lines 312d, 312e, 312f and magnetic field lines 312g, 312h, 312i are different and less vertical, i.e., less aligned with the z axis of the Cartesian coordinates 340. Accordingly, output signals from third, second, and fourth vertical Hall effect elements 304, 306, 308 change amplitude by different amounts and with different magnitude signs as the ferromagnetic object 314 approaches the magnetic field sensor 300 from different sides. The change in magnitudes and signs of the output signals can be detected to indicate not only a separation (or a separation threshold) associated with proximity of the ferromagnetic object 314 to the magnetic field sensor 300, but also from which side (or, in some embodiments, from which quadrant I, II, IV of FIG. 2) the ferromagnetic object 314 approaches.

FIGS. 4-7 below show representative electronic circuits that can be used to detect the above-described proximity of the ferromagnetic object 314 to the magnetic field sensor 300 of FIG. 3, having one, two, or four vertical Hall effect elements. In each of FIGS. 4-7, while not shown, in some embodiments, circuits can be used that accomplish current spinning described above. However, in other embodiments, current spinning is not used.

Referring now to FIG. 4, an electronic circuit 400 can be the same as or similar to the electronic circuit 214 of FIG. 2, but using only one vertical Hall effect element, for example, the first vertical Hall element 204 of FIG. 2. While it is indicated that the first vertical Hall effect element 204 is used with the electronic circuit 400, in other embodiments, the vertical Hall effect element that is used can be any one of the vertical Hall elements of FIG. 4.

The electronic circuit 400 can include an amplifier 404 coupled to receive a differential signal 402. The differential signal 402 can be coupled to a vertical Hall effect element.

The amplifier 404 can generate an amplified signal 404a.

A comparator circuit 410 can be coupled to receive the amplified signal 404a and coupled to receive a reference signal 414. The comparator circuit 410 can be configured to generate a comparison signal 410a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a first two adjacent quadrants (e.g., I, IV) (see I, II, III, IV of FIG. 2) of the substrate 202 than to other quadrants.

A comparator circuit 420 can be coupled to receive the amplified signal 404a and coupled to receive a different reference signal 418. The comparator circuit 420 can be configured to generate a comparison signal 420a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a second two adjacent quadrants (e.g., II, III) (see I, II, III, IV of FIG. 2) of the substrate 202 than to other quadrants.

The comparison signals 410a, 420a provide a nonlinear magnetic field sensor.

The comparator circuits 410, 420 and other comparator circuits herein can be linear comparators. However, in other embodiments, the comparator circuits can be digital circuits configured to generate output signals having at least two different states.

A position calculation module 412 can be coupled to the comparators 410, 420. The position calculation module 412 can be operable to generate a position signal 412a indicative of both proximity of the ferromagnetic object 314 and also on which side of an axis, e.g., on which side of the coordinate axis 232, the ferromagnetic object 314 is proximate. Thus, the electronic circuit 400 can be operable to identify both proximity and position of the ferromagnetic object 314.

An output format module 416 can be coupled to receive the position signal 412a and can be configured to generate a formatted signal 416a indicative of the position signal 412a. The formatted signal 416a can be in one of a variety of signal formats, including, but not limited to, a PWM format, a SENT format, an I2C format, and a CAN format.

In some embodiments, the amplified signal 404a can be coupled to the position calculation module 412 and the position signal 412a can be indicative of a linear representation of a signed amplitude of the amplified signal 404a, which can provide a linear representation of both proximity and position (i.e., two quadrant localization), of the ferromagnetic object 314, either a continuous linear representation or a multi-step digital representation.

Referring now to FIG. 5, an electronic circuit 500 can be the same as or similar to the electronic circuit 214 of FIG. 2, but using two vertical Hall effect elements, for example, the first and second vertical Hall elements 204, 206, respectively, of FIG. 2, physically arranged in parallel to each other. While it is indicated that the first and second vertical Hall effect elements 204, 206 are used with the electronic circuit 500, in other embodiments, the vertical Hall effect elements can be any two of the vertical Hall elements of FIG. 2 that are aligned along an axis.

The electronic circuit 500 can include amplifiers 504, 516 coupled to receive differential signals 502, 514, respectively. The differential signals 502, 514 can be coupled to two respective vertical Hall effect elements.

The amplifiers 504, 516 can generate amplified signals 504a, 516a. A summing circuit 506 can receive and sum the amplified signals 504a, 516a and can generate a summed signal 506a.

A comparator circuit 508 can be coupled to receive the summed signal 506a and coupled to receive a reference signal 520. The comparator circuit 508 can be configured to generate a comparison signal 508a having a first state indicative of the ferromagnetic object 314 being far away from the magnetic field sensor 300 and having a second different state indicative of the ferromagnetic object 314 being both closer to the magnetic field sensor 300 and also closer to a first two adjacent quadrants (e.g., I, IV) (see I, II, III, IV of FIG. 2) of the substrate 202 than to other quadrants.

A comparator circuit 518 can be coupled to receive the summed signal 506a and coupled to receive a different reference signal 518. The comparator circuit 518 can be configured to generate a comparison signal 518a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a second two adjacent quadrants (e.g., II, III) (see I, II, III, IV of FIG. 2) of the substrate 202 than to other quadrants.

The comparison signals 510a, 518a provide a nonlinear magnetic field sensor.

A position calculation module 510 can be the same as or similar to the position calculation module 412. An output format module 512 can be the same as or similar to the output format module 416 of FIG. 4

In some embodiments, the summed signal 506a can be coupled to the position calculation module 510 and the position signal 510a can be indicative of a linear representation of a signed amplitude of the summed signal 506a, which can provide a linear representation of both proximity and position (i.e., two of four quadrant localization) of the ferromagnetic object 314, either a continuous linear representation or a multi-step digital representation.

Figure 6:
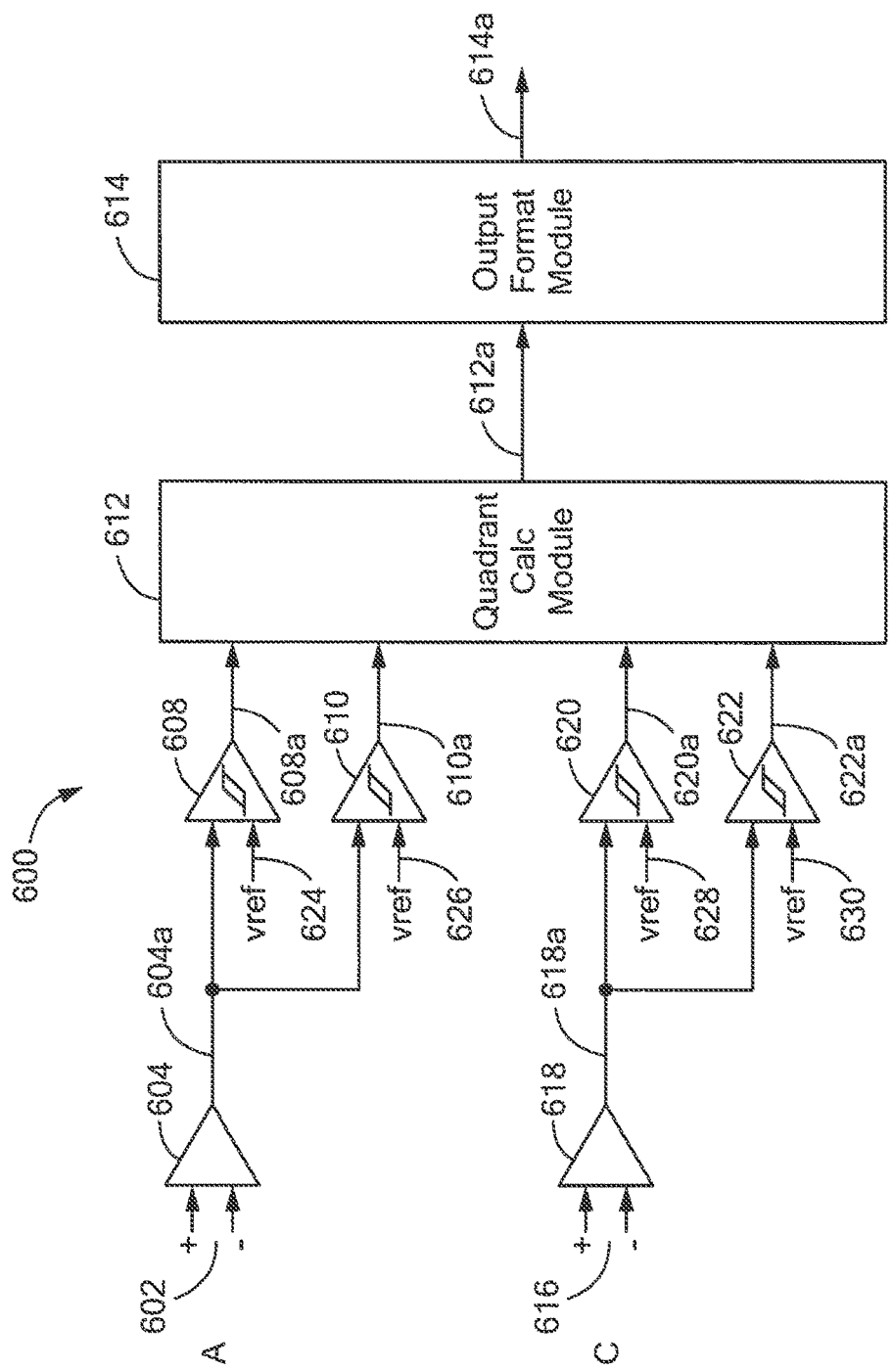
FIG. 6 is a block diagram showing further details of another example of the electronic circuit of the back-biased proximity sensor FIG. 3 when the back-biased proximity sensor uses a two vertical Hall effect elements arranged at different positions than the arrangement of FIG. 5.

Referring now to FIG. 6, an electronic circuit 600 can be the same as or similar to the electronic circuit 214 of FIG. 2, but using two vertical Hall effect elements different than those of FIG. 5, for example, the first and third vertical Hall elements 204, 208, respectively, of FIG. 2, physically arranged at respective ninety degree angles to each other. While it is indicated that the first and third vertical Hall effect elements 204, 208 are used with the electronic circuit 600, in other embodiments, the vertical Hall effect elements can be any two of the vertical Hall elements of FIG. 2 that are arranged at angles to each other, e.g., ninety degrees.

The electronic circuit 600 can include amplifiers 604, 618 coupled to receive differential signals 602, 616. The differential signals 602, 616 can be coupled to two respective vertical Hall effect elements.

The amplifiers 604, 618 can generate amplified signals 604a, 618a.

A comparator circuit 608 can be coupled to receive the amplified signal 604a and coupled to receive a reference signal 624. The comparator circuit 608 can be configured to generate a comparison signal 608a having a first state indicative of the ferromagnetic object 314 being far away from the magnetic field sensor 300 and having a second different state indicative of the ferromagnetic object 314 being both closer to the magnetic field sensor 300 and also closer to a first two adjacent quadrants (e.g., I, IV) (see I, II, III, IV of FIG. 2) of the substrate 202 then to other quadrants.

A comparator circuit 610 can be coupled to receive the amplified signal 604a and coupled to receive a different reference signal 626. The comparator circuit 610 can be configured to generate a comparison signal 610a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a second two adjacent quadrants (e.g., II, III) (see I, II, III, IV of FIG. 2) of the substrate 202 than to other quadrants.

A comparator circuit 620 can be coupled to receive the amplified signal 618a and coupled to receive a reference signal 628. The comparator circuit 620 can be configured to generate a comparison signal 620a having a first state indicative of the ferromagnetic object 314 being far away from the magnetic field sensor 300 and having a second different state indicative of the ferromagnetic object 314 being both closer to the magnetic field sensor 300 and also closer to a third two adjacent quadrants (e.g., I, II) (see I, II, III, IV of FIG. 2) of the substrate 202 then to other quadrants.

A comparator circuit 622 can be coupled to receive the amplified signal 618a and coupled to receive a different reference signal 630. The comparator circuit 622 can be configured to generate a comparison signal 622a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a fourth two adjacent quadrants (e.g., III, IV) (see I, II, III, IV of FIG. 2) of the substrate 202 than to other quadrants.

Because the above-described quadrant pairs are at ninety degrees to each other, the magnetic field sensor 600 can identify one quadrant (e.g., IV) to which the ferromagnetic object 314 is closest.

The comparison signals 608a, 610a, 620a, 622a can provide a nonlinear magnetic field sensor.

A quadrant calculation module 612 can be similar to the position calculation module 412 of FIG. 4. However, the quadrant calculation module 612 can generate a quadrant signal 612a that can localize the position of the ferromagnetic object 314 to be within a single quadrant. An output format module 614 can be similar to the output format module 416 of FIG. 4.

In some embodiments, the amplified signal 604a and the amplified signal 618a can be coupled to the position calculation module 612 and the position signal 612a can be indicative of a linear representation of signed amplitudes of the amplified signals 604a, 618a, which can provide a linear representation of both proximity and position (i.e., one of four quadrant localization) of the ferromagnetic object 314, either a continuous linear representation or a multi-step digital representation.

Figure 7:
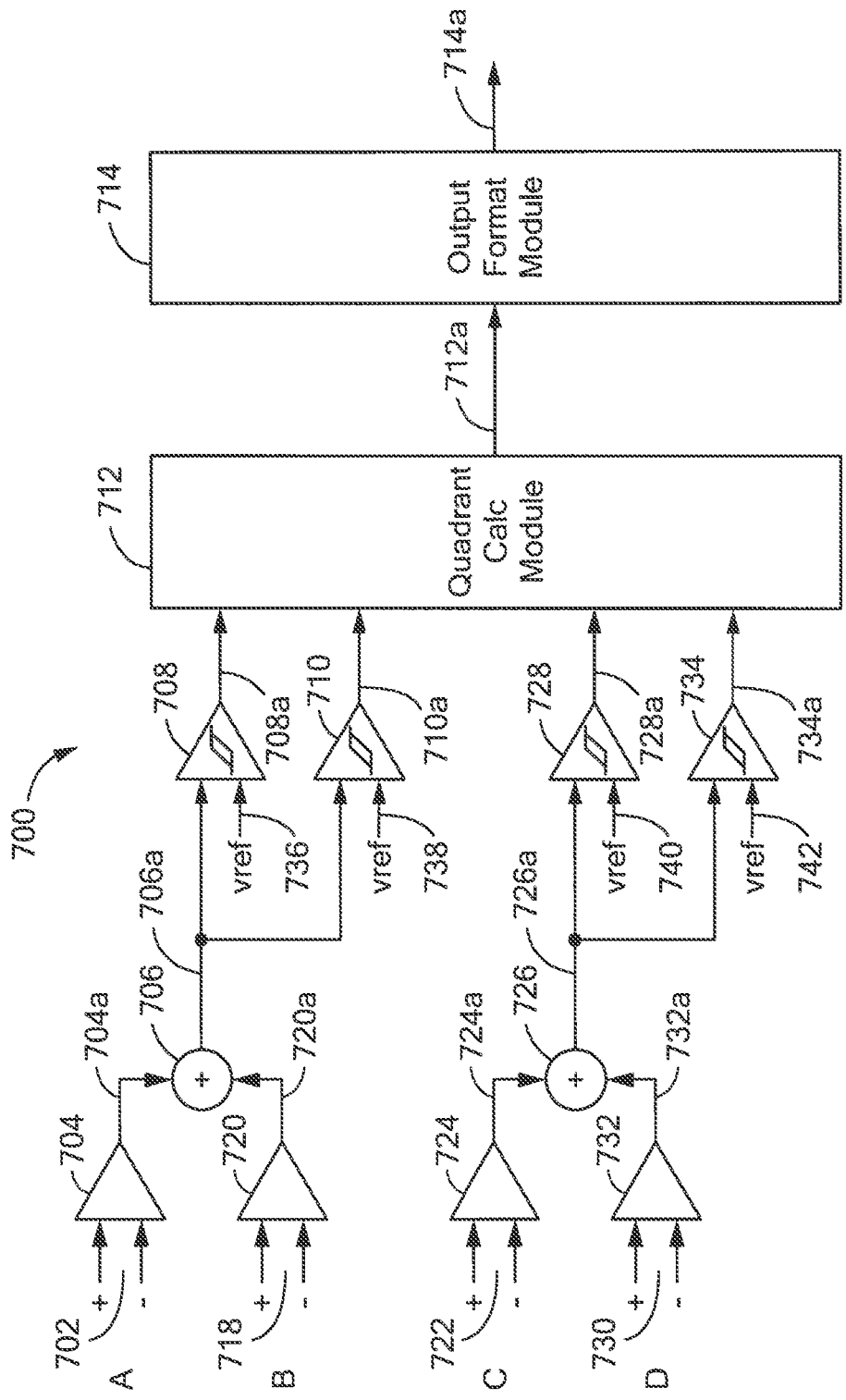
FIG. 7 is a block diagram showing further details of an example of the electronic circuit of the back-biased proximity sensor FIG. 3, when the back-biased proximity sensor uses four vertical Hall effect elements as shown in FIG. 4.

Referring now to FIG. 7, an electronic circuit 700 can be the same as or similar to the electronic circuit 214 of FIG. 2, but using a four vertical Hall effect elements, for example, the first, second, third and fourth vertical Hall elements 204, 206, 208, 210 respectively, of FIG. 2. While it is indicated that the first and second vertical Hall effect elements 204, 206 are aligned along the second coordinate axis 232 and the third and fourth vertical Hall effect element 208, 210 are aligned along the first coordinate axis 230, in other embodiments, the vertical Hall effect elements can have a different alignment.

The electronic circuit 700 can include amplifiers 704, 720 coupled to receive differential signals 702, 718. The differential signals 702, 718 can be coupled to two respective vertical Hall effect elements, e.g., first and second vertical Hall effect elements 204, 206, respectively, of FIG. 2, which can be physically arranged in parallel.

The amplifiers 704, 720 can generate amplified signals 704a, 720a. A summing circuit 706 can receive and sum the amplified signals 704a, 720a and can generate a summed signal 706a.

A comparator circuit 708 can be coupled to receive the summed signal 706a and coupled to receive a reference signal 736. The comparator circuit 708 can be configured to generate a comparison signal 708a having a first state indicative of the ferromagnetic object 314 being far away from the magnetic field sensor 300 and having a second different state indicative of the ferromagnetic object 314 being both closer to the magnetic field sensor 300 and also closer to a first two adjacent quadrants (e.g., I, IV) (see I, II, III, IV of FIG. 2) of the substrate 202 than to other quadrants.

A comparator circuit 710 can be coupled to receive the summed signal 706a and coupled to receive a different reference signal 738. The comparator circuit 710 can be configured to generate a comparison signal 710a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a second two adjacent quadrants (e.g., II, III) (see I, II, III, IV of FIG. 2) of the substrate 202 than to other quadrants.

The electronic circuit 700 can include amplifiers 724, 732 coupled to receive differential signals 722, 730. The differential signals 722, 730 can be coupled to two respective vertical Hall effect elements, e.g., third and fourth vertical Hall effect elements 208, 210, respectively, of FIG. 2, which can be physically arranged in parallel but at an angle, for example ninety degrees, relative to the first and second vertical Hall elements 204, 206.

The amplifiers 724, 732 can generate amplified signals 724a, 732a. A summing circuit 726 can receive and sum the amplified signals 724a, 732a and can generate a summed signal 726a.

A comparator circuit 728 can be coupled to receive the summed signal 726a and coupled to receive a reference signal 740. The comparator circuit 728 can be configured to generate a comparison signal 728a having a first state indicative of the ferromagnetic object 314 being far away from the magnetic field sensor 300 and having a second different state indicative of the ferromagnetic object 314 being both closer to the magnetic field sensor 300 and also closer to a third two adjacent quadrants (e.g., I, II) (see I, II, III, IV of FIG. 2) of the substrate 202 than to other quadrants.

A comparator circuit 734 can be coupled to receive the summed signal 726a and coupled to receive a different reference signal 742. The comparator circuit 734 can be configured to generate a comparison signal 734a having a first state indicative of the ferromagnetic object 314 of FIG. 3 being far away from the magnetic field sensor 300 and having a second different state indicative of the ferromagnetic object 314 being both closer to the magnetic field sensor 300 and also closer to a fourth two adjacent quadrants (e.g., III, IV) (see I, II, III, IV of FIG. 2) of the substrate 202 than to other quadrants.

Because the above-described quadrant pairs are at ninety degrees to each other, the magnetic field sensor 700 can identify one quadrant (e.g., IV) to which the ferromagnetic object 314 is closest.

The comparison signals 708a, 710a, 728a, 734a can provide a nonlinear magnetic field sensor.

A quadrant calculation module 712 can be similar to the position calculation module 412 of FIG. 4. However, the quadrant calculation module 712 can generate a quadrant signal 712a that can localize the position of the ferromagnetic object 314 to be within a single quadrant. An output format module 714 can be similar to the output format module 416 of FIG. 4.

In some embodiments, the summed signal 706a and the summed signal 726a can be coupled to the quadrant calculation module 712 and the position signal 712a can be indicative of a linear representation of signed amplitudes of the summed signals 704a, 718a, which can provide a linear representation of both proximity and position (i.e., one quadrant localization) of the ferromagnetic object 314, either a continuous linear representation or a multi-step digital representation.

While magnetic field sensors and electronic circuits of FIGS. 2-10 are representative of one, two, three, four, or more vertical Hall effect elements, in other embodiments, each one of the vertical Hall effect elements can be replaced by one or more magnetoresistance elements. It will be understood that a both a vertical Hall effect element and a magnetoresistance element have maximum response axes parallel to a substrate upon which they are disposed.

Current spinning is not used with magnetoresistance elements. However, magnetoresistance elements can be used in bridge arrangements.

Figure 8:
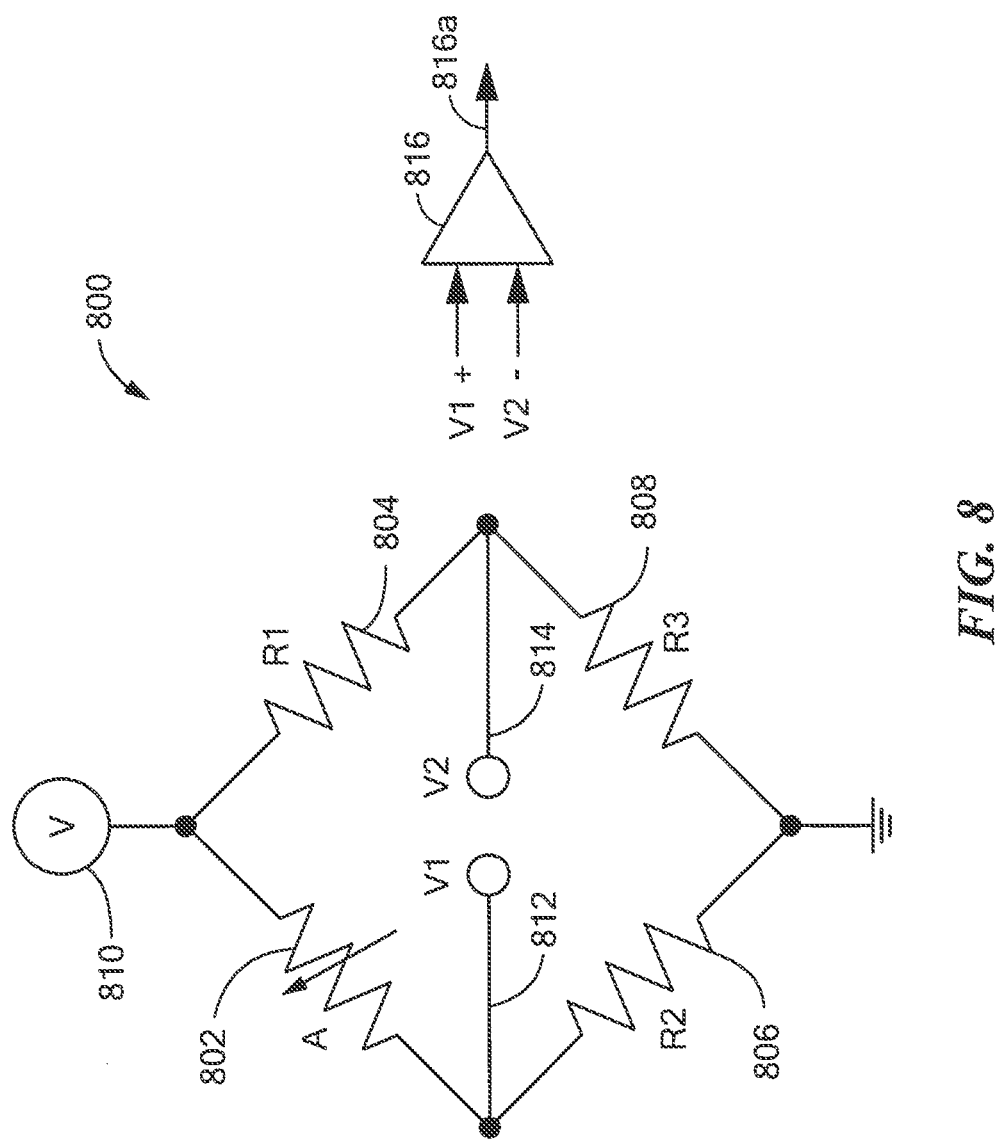
FIG. 8 is a block diagram showing magnetoresistance elements that can be used in the above proximity sensors in place of the vertical Hall effect elements.

Referring now to FIG. 8, a magnetoresistance element bridge 800 can use a magnetoresistance element 802 indicative of any one of the vertical Hall effect elements 204, 206, 208, 210, respectively, of FIG. 2. The magnetoresistance elements 802 can be coupled in a bridge arrangement to fixed resistors 804, 806, 808. A differential signal 812, 814 can be coupled to an amplifier 816 to generate and amplified signal 816a. The amplifier 816 can be the same as or similar to any of the amplifiers of FIGS. 4-7.

In other embodiments, magnetoresistance elements can be used as any of the above-described vertical Hall effect elements.

Figure 9:
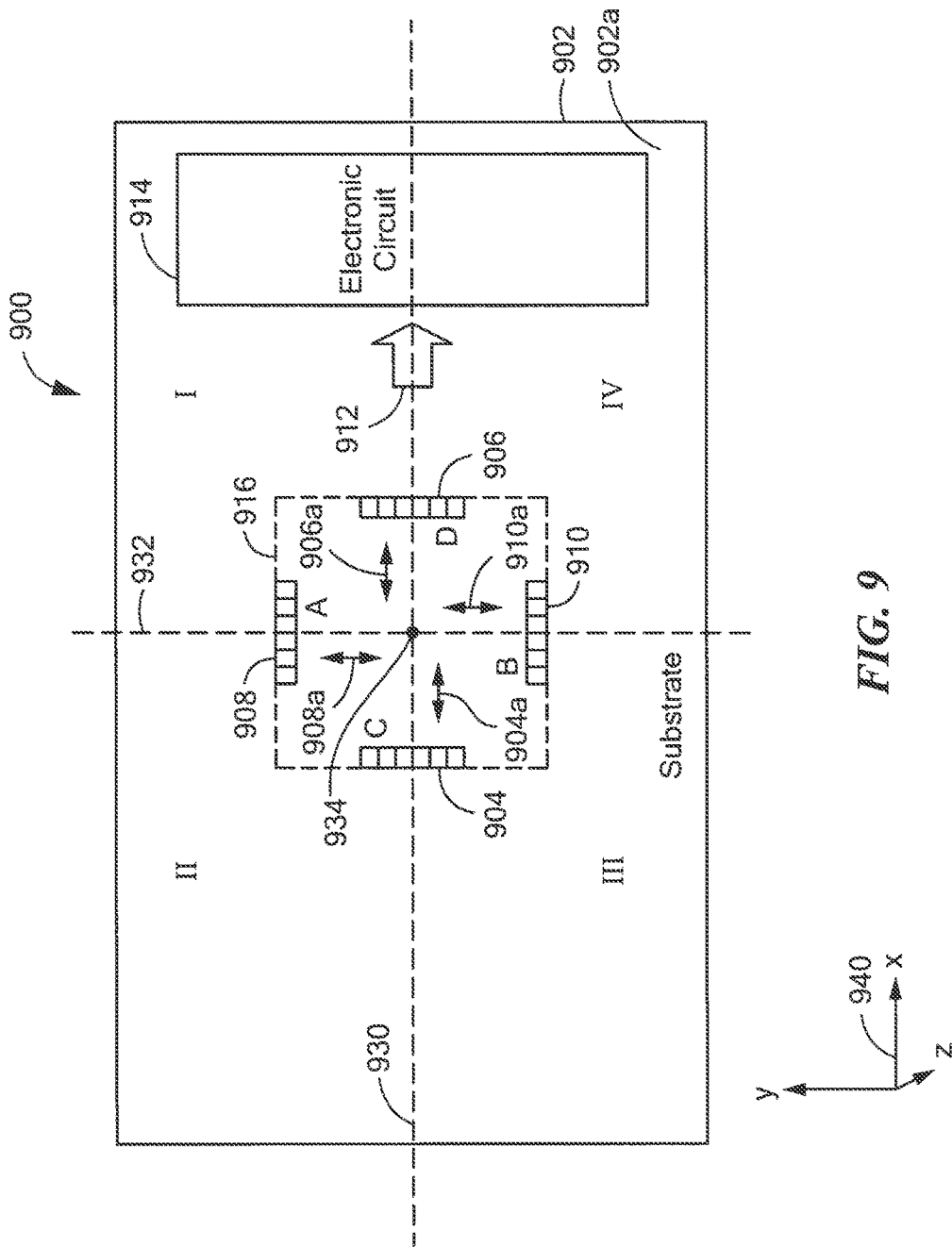
FIG. 9 is a block diagram showing a top view of an example of a substrate of the back-biased proximity sensor of FIG. 1 and having four magnetic field sensing elements shown as vertical Hall effect elements, all disposed inside of the above-mentioned substrate region, and having an electronic circuit.

Referring now to FIG. 9, a substrate 902 with a first surface 902a can be the same as or similar to the substrate 102 with the first surface 109a of FIG. 1. A substrate region 916 with a coordinate axis point 934 can be the same as or similar to the substrate region 104 with the coordinate axis point 120 of FIG. 1. An electronic circuit 914 can be the same as or similar to the electronic circuit 110 of FIG. 1. A first coordinate axis 930 and a second coordinate axis 932 can be the same as or similar to first and second coordinate axes 106, 108, respectively, of FIG. 1.

Quadrants I, II, III, IV are indicative of quadrants defined by the first and second coordinate axes 930, 932 and are the same as or similar to the quadrants I, II, III, IV of FIG. 1.

The first and second coordinate axes 930, 932 can have any angle relative to the substrate 902.

First, second, third and fourth vertical Hall elements 904, 906, 908, 910 can be disposed on, in, or over the first surface 902a of the substrate 902 and within the substrate region 916. Maximum response axes 904a, 906a of the first and second vertical Hall effect elements 904, 906, respectively, can be generally aligned with the first coordinate axis 930. Maximum response axes 908a, 910a of the third and fourth vertical Hall effect elements 908, 910, respectively, can be generally aligned with the second coordinate axis 932.

Cartesian coordinates 940 show that the first surface 902a of the substrate 902 can be in the same x-y plane identified in FIG. 1.

While four vertical Hall effect elements are shown, in other embodiments, there can be one, two, three, four, or more vertical Hall elements. Also, while the maximum response axes 904a, 906a, 908a, 910a of the magnetic field sensing elements 904, 906, 908, 910, respectively, are shown to be aligned with first and second coordinate axes 930, 932, respectively, in other embodiments, the maximum response axes can be at other positions.

For embodiments that use one vertical Hall effect element, the one vertical Hall effect element can be any one of the four vertical Hall effect elements. The one vertical Hall effect element can also be at another position within the substrate region 916, for example, at a center of the substrate region 916.

For embodiments that use two vertical Hall effect elements, the two vertical Hall effect elements can be any two of the four vertical Hall effect elements. The two vertical Hall effect elements can also be at other positions within the substrate region 916.

For embodiments that use three vertical Hall effect elements, the three vertical Hall effect elements can be any three of the four vertical Hall effect elements. The three vertical Hall effect elements can also be at other positions within the substrate region 916.

In general, it will be understood that having more than one vertical Hall effect element has advantages. For example, a signal to noise ratio can be improved by using more than one vertical Hall effect element.

Figure 10:
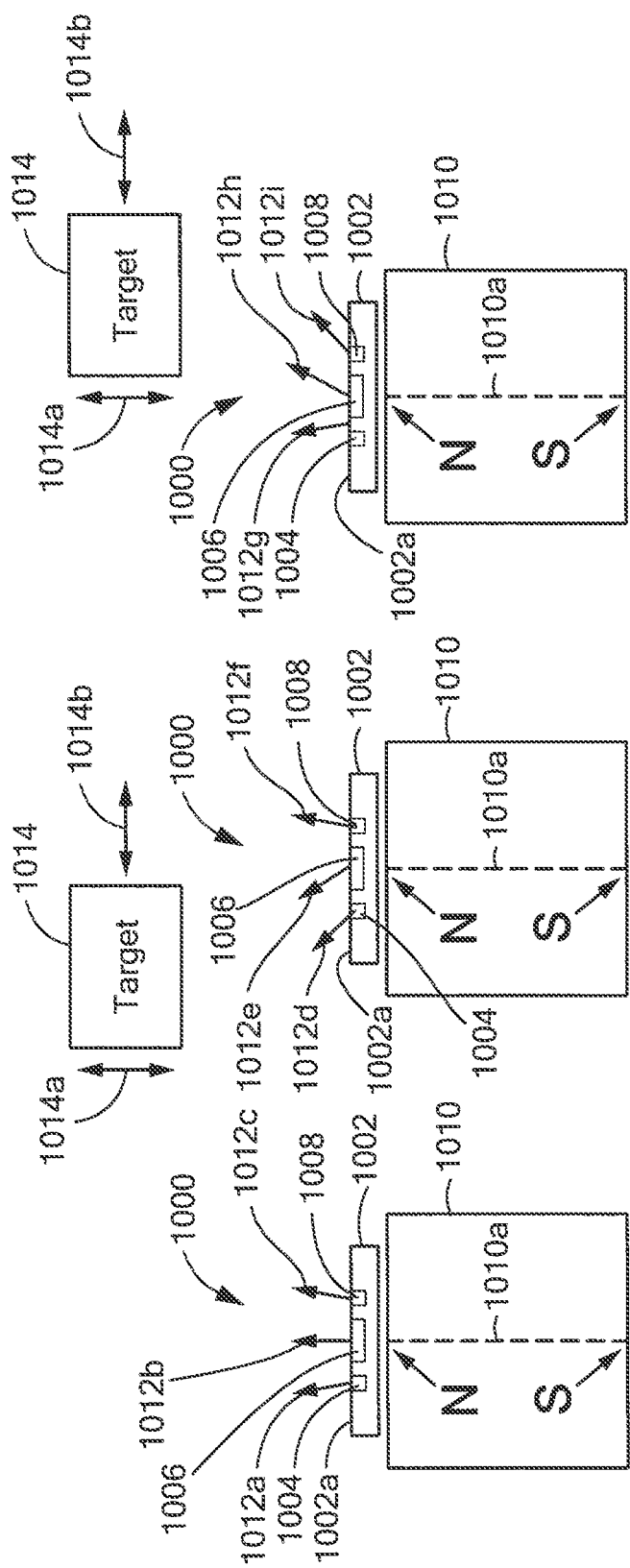
FIG. 10 is a block diagram showing a side view of a back-biased proximity sensor according to the back-biased proximity sensor of FIGS. 1 and 9 and showing different magnetic field line directions when in the presence of no ferromagnetic object and when the ferromagnetic object is closer to the back-biased proximity sensor at two different positions.

Referring now to FIG. 10, a back-biased magnetic field sensor 1000 is shown in three views as a ferromagnetic object 1014 approaches in a direction 1014a parallel to a z axis of Cartesian coordinates 1040 and also moves in a direction 1014b parallel to an x (and/or y) axis.

The back-biased magnetic field sensor 1000 can be the same as or similar to the magnetic field sensor 100 of FIG. 1. The back-biased magnetic field sensor 1000 can include a magnet 1010 with a magnet axis 1010a, which can be the same as or similar to the magnet 112 with the magnet axis 114 of FIG. 1. The back-biased magnetic field sensor 1000 can include a substrate 1002 with a first surface 1002a, which can be the same as or similar to the substrate 102 with the first surface 102a of FIG. 1.

First, fourth, and second vertical Hall effect elements 1004, 1006, 1008 can be the same as or similar to the First, fourth, and second vertical Hall effect elements 904, 910, 906 of FIG. 9. A third vertical Hall effect element comparable to the third vertical Hall effect element 908 is not shown, for clarity.

In a left hand view, no ferromagnetic object (e.g., 1014) is proximate to the back-biased magnetic field sensor 1000. Magnetic field line 1012a is representative of a magnetic field direction at the first vertical Hall effect element 1004, and is only slightly tilted (e.g., substantially perpendicular) in a negative x direction in an x-z plane in Cartesian coordinates 1040. Magnetic field line 1012b is representative of a magnetic field direction at the fourth vertical Hall effect element 1006, and is only slightly tilted (e.g., substantially perpendicular) in a positive y direction in a y-z plane in Cartesian coordinates 1040. Magnetic field line 1012c is representative of a magnetic field direction at the second vertical Hall effect element 1008, and is only slightly tilted (e.g., substantially perpendicular) in a positive x direction in the x-z plane in Cartesian coordinates 1040.

Due to the directions of the maximum response axes 904a, 910a, 906a of FIG. 9 of the first, fourth, and second vertical Hall effect elements 904, 910, 906, it should be recognized that the first, fourth, and second vertical Hall effect elements 1004, 1006, 1008 of FIG. 10 have output signals that are nearly zero, since they have maximum response axes that are in the x-y plane, and since projections of the magnetic field lines 1012a, 1012b, 1012c upon respective maximum response axes in the x-y plane to which the vertical Hall elements are sensitive (see, e.g., FIG. 9) are nearly zero.

In the second and third panels of FIG. 10, as the ferromagnetic object 1014 approaches at one side and then at other side of the centerline 1010a of the magnet 1010, magnetic field lines 1012d, 1012e, 1012f and magnetic field lines 1012g, 1012h, 1012i are different and less vertical, i.e., less aligned with the z axis of the Cartesian coordinates 1040. Accordingly, output signals from the first, fourth, and second vertical Hall effect elements 1004, 1006, 1008 change amplitude by different amounts and with different magnitude signs as the ferromagnetic object 1014 approaches the magnetic field sensor 1000 from different sides. The change in magnitudes and signs of the output signals can be detected to indicate not only a separation (or a separation threshold) associated with proximity of the ferromagnetic object 1014 to the magnetic field sensor 1000, but also from which side (or, in some embodiments, from which quadrant I, II, III, IV of FIG. 9) the ferromagnetic object 1014 approaches.

To this end the electronic circuit 914 of FIG. 9 can be the same as or similar to the electronic circuits of FIGS. 4-7 for different number of vertical Hall effect elements.

The four vertical Hall effect elements 904, 906, 908, 910 can also be arranged in a circle, with four vertical Hall effect elements, or with fewer than or more than four vertical Hall effect elements.

For arrangements that use more than four vertical Hall effect elements, a circular vertical Hall (CVH) sensing element can be used as described below in conjunction with FIG. 11.

Figure 11:
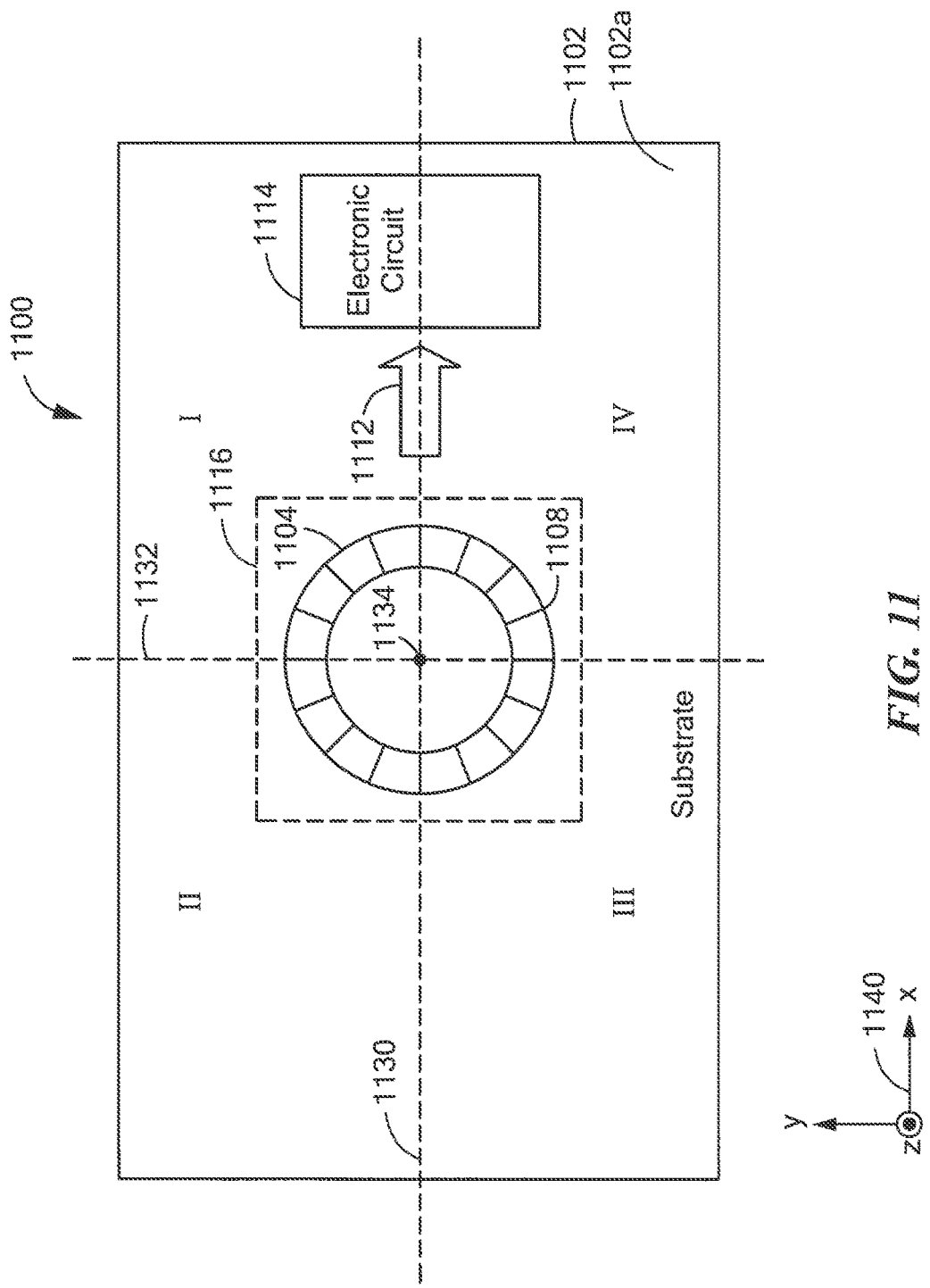
FIG. 11 is a block diagram showing a top view of an example of a substrate of the back-biased proximity sensor of FIG. 1 and having a circular vertical Hall (CVH) sensing element having a ring of a plurality of vertical Hall effect elements, all disposed inside of the above-mentioned substrate region, and having an electronic circuit.

Referring now to FIG. 11, a substrate 1102 with a first surface 1102a can be the same as or similar to the substrate 102 with the first surface 102a of FIG. 1. A substrate region 1116 with a coordinate axis point 1134 can be the same as or similar to the substrate region 104 with the coordinate axis point 120 of FIG. 1. An electronic circuit 1114 can be the same as or similar to the electronic circuit 110 of FIG. 1. A first coordinate axis 1130 and a second coordinate axis 1132 can be the same as or similar to first and second coordinate axes 106, 108, respectively, of FIG. 1.

Quadrants I, II, III, IV are indicative of quadrants defined by the first and second coordinate axes 1130, 1132 and are the same as or similar to the quadrants I, II, III, IV of FIG. 1.

The first and second coordinate axes 1130, 1132 can have any angle relative to the substrate 1102.

A plurality of vertical Hall elements arranged as a circular vertical Hall (CVH) sensing element 1104 can be disposed on, in, or over the first surface 1102a of the substrate 1102 and within the substrate region 1116. Maximum response axes of the CVH sensing element 1104 can be parallel to an x-y plane of the first surface 1102 of the substrate 1102.

CVH sensing elements and electronic circuit associated therewith are not described in detail herein. However, let it suffice here to say that a CVH sensing element comprises a plurality of overlapping vertical Hall elements (i.e., overlapping sets of electrical contacts) arranged over a common circular implant and diffusion region without diffused barriers between the plurality of vertical Hall elements. In operation, the plurality of vertical Hall elements can be sequentially driven, for example, one at a time, and sequential signals can be generated from the plurality of vertical Hal elements on a common signal path. The sequential signals are indicative of sequential analog signal samples, each sample from one of the vertical Hall elements.

Some CVH sensing elements have thirty-two or sixty-four electrical contacts, and therefore, thirty-two or sixty-four vertical Hall elements. However, other numbers of electrical contacts can result in a CVH sensing element with more than thirty-two (or more than sixty-four) or fewer than thirty-two (or fewer than thirty-two) vertical Hall elements.

It should be apparent from discussion above that each one of the vertical Hall elements in the CVH sensing element can generate a sample having a sample value indicative of a magnitude of a magnetic field as projected upon the x-y plane. Thus, the sample values can be indicative of a proximity of and a position of a ferromagnetic object in much the same way as described above in conjunction with FIGS. 9 and 10. The signal samples can be digitized and a processor can analyze the signal values to determine the above.

CVH sensing elements are described in more detail in conjunction with U.S. Pat. No. 8,729,890, issued May 20, 2014, with patent is incorporated herein in its entirety.

Conventionally, CVH sensing elements are not used in a back-biased arrangement described herein, but instead with a magnet that has a magnetic direction parallel to the surface 1102a of the substrate 1102.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for sensing a movement of a ferromagnetic object along a path, the magnetic field sensor comprising:
   a magnet;
   a semiconductor substrate proximate to the magnet and at a position between the ferromagnetic object and the magnet, the semiconductor substrate comprising:
   first and second substrate axes on the a surface of the semiconductor substrate intersecting at a substrate axes point, the first and second substrate axes describing four half planes and four planar portions, each planar portion less than a half plane, the four half planes and the four planar portions in a plane of the substrate axes, wherein a first two of the four half planes are on opposite sides of the first substrate axis and a second two of the four half planes are on opposite sides of the second substrate axis; and
   a substrate region upon the surface of the semiconductor substrate, the substrate region proximate to and surrounding the substrate axes point, wherein magnetic fields generated by the magnet at the substrate region are substantially perpendicular to the semiconductor substrate in the absence of the ferromagnetic object, the magnetic field sensor further comprising:
   a first magnetic field sensing element disposed on or under the surface of the semiconductor substrate and disposed within the substrate region, wherein the first magnetic field sensing element comprises an axis of maximum sensitivity substantially parallel to the first substrate axis, wherein a center of the first magnetic field sensing element is disposed on the second substrate axis; and
   an electronic circuit disposed on or under the surface of the semiconductor substrate, coupled to the first magnetic field sensing element and configured to generate a position signal having a plurality of states, wherein each state is indicative of the ferromagnetic object being closer than or further than a predetermined distance perpendicular to any part of any one of the four half planes according to a separation threshold from the semiconductor substrate, and each state is indicative of to which respective one of the four half planes the ferromagnetic object is most proximate.

2. The magnetic field sensor of claim 1, wherein the electronic circuit is further configured to generate a two-state comparison signal having a change of state when the ferromagnetic object moves closer to the semiconductor substrate than a predetermined distance.

3. The magnetic field sensor of claim 1, wherein the first magnetic field sensing element comprises a vertical Hall effect element.

4. The magnetic field sensor of claim 1, wherein the first magnetic field sensing element comprises a magnetoresistance element.

5. The magnetic field sensor of claim 1, further comprising:
   a second magnetic field sensing element disposed on or under the surface of the semiconductor substrate and disposed within the substrate region, wherein the second magnetic field sensing element comprises an axis of maximum sensitivity substantially parallel to the axis of maximum sensitivity of the first magnetic field sensing element.

6. The magnetic field sensor of claim 5, wherein a center of the second magnetic field sensing element is disposed on the second substrate axis and not on the substrate axes point.

7. The magnetic field sensor of claim 6, wherein the centers of the first and second magnetic field sensing elements are substantially equidistant from and on opposite sides of the substrate axes point.

8. The magnetic field sensor of claim 5, wherein the electronic circuit is also coupled to the second magnetic field sensing element, wherein the electronic circuit is further configured to generate a two-state comparison signal having a change of state when the ferromagnetic object moves closer to the semiconductor substrate than the predetermined distance.

9. The magnetic field sensor of claim 5, wherein the electronic circuit is also coupled to the second magnetic field sensing element.

10. The magnetic field sensor of claim 5, wherein the first and second magnetic field sensing elements comprise vertical Hall effect elements.

11. The magnetic field sensor of claim 5, wherein the first and second magnetic field sensing elements comprise magnetoresistance elements.

12. The magnetic field sensor of claim 5, further comprising:
a third magnetic field sensing element disposed on or under the surface of the semiconductor substrate and disposed within the substrate region, wherein the third magnetic field sensing element comprises an axis of maximum sensitivity not parallel to the axis of maximum sensitivity of the first magnetic field sensing element; and
a fourth magnetic field sensing element disposed on or under the surface of the semiconductor substrate and disposed within the substrate region, wherein the fourth magnetic field sensing element comprises an axis of maximum sensitivity not parallel to the axis of maximum sensitivity of the first magnetic field sensing element.

13. The magnetic field sensor of claim 12, wherein the center of the first magnetic field sensing element is disposed on the second substrate axis, wherein a center of the second magnetic field sensing element is disposed on the second substrate axis, wherein a center of the third magnetic field sensing element is disposed on the first substrate axis and not on the substrate axes point, wherein a center of the fourth magnetic field sensing element is disposed on the first substrate axis and not on the substrate axes point.

14. The magnetic field sensor of claim 13, wherein the centers of the first and second magnetic field sensing elements are substantially equidistant from and on opposite sides of the substrate axes point, and wherein the centers of the third and fourth magnetic field sensing elements are substantially equidistant from and on opposite sides of the substrate axes point.

15. The magnetic field sensor of claim 12, wherein the first, second, third, and fourth magnetic field sensing elements are vertical Hall elements within a circular vertical Hall (CVH) sensing element.

16. The magnetic field sensor of claim 12, wherein the electronic circuit is also coupled to the third and fourth magnetic field sensing elements, wherein the electronic circuit is further configured to generate a two-state comparison signal having a change of state when the ferromagnetic object moves closer to the semiconductor substrate than the predetermined distance.

17. The magnetic field sensor of claim 12, wherein the electronic circuit is further coupled to the second, third, and fourth magnetic field sensing elements and wherein each state is further indicative of to which respective one of the four planar portions the ferromagnetic object is most proximate.

18. The magnetic field sensor of claim 12, wherein the first, second, third, and fourth magnetic field sensing elements comprise vertical Hall effect elements.

19. The magnetic field sensor of claim 12, wherein the first, second, third, and fourth magnetic field sensing elements comprise magnetoresistance elements.

20. The magnetic field sensor of claim 12, wherein the position signal comprises a digital signal.

21. The magnetic field sensor of claim 12, wherein the magnetic field sensor is operable to sense the movement of the ferromagnetic object when the ferromagnetic object moves without rotation of the ferromagnetic object.

22. The magnetic field sensor of claim 5, wherein the position signal comprises a digital signal.

23. The magnetic field sensor of claim 5, wherein the magnetic field sensor is operable to sense the movement of the ferromagnetic object when the ferromagnetic object moves without rotation of the ferromagnetic object.

24. The magnetic field sensor of claim 1, further comprising:
a second magnetic field sensing element disposed on or under the surface of the semiconductor substrate and disposed within the substrate region, wherein the second magnetic field sensing element comprises an axis of maximum sensitivity substantially perpendicular to the axis of maximum sensitivity of the first magnetic field sensing element.

25. The magnetic field sensor of claim 24, wherein a center of the second magnetic field sensing element is disposed on the first substrate axis, and wherein the centers of the first and second magnetic field sensing elements are substantially equidistant from the substrate axes point and not on the substrate axis point.

26. The magnetic field sensor of claim 24, wherein the electronic circuit is also coupled to the second magnetic field sensing element, wherein the electronic circuit is further configured to generate a two-state comparison signal having a change of state when the ferromagnetic object moves closer to the semiconductor substrate than the predetermined distance.

27. The magnetic field sensor of claim 24, wherein the electronic circuit is also coupled to the second magnetic field sensing element, and wherein each state is further indicative of to which respective one of the four planar portions the ferromagnetic object is most proximate.

28. The magnetic field sensor of claim 24, wherein the first and second magnetic field sensing elements comprise vertical Hall effect elements.

29. The magnetic field sensor of claim 24, wherein the first and second magnetic field sensing elements comprise magnetoresistance elements.

30. The magnetic field sensor of claim 1, wherein the magnetic field sensor is operable to sense the movement of the ferromagnetic object when the ferromagnetic object moves without rotation of the ferromagnetic object.

31. The magnetic field sensor of claim 1, wherein the position signal comprises a digital signal.

* * * * *

UNITED STATES PATENT AND TRADEMARK OFFICE
CERTIFICATE OF CORRECTION

PATENT NO. : 10,215,590 B2
APPLICATION NO. : 15/176668
DATED : February 26, 2019
INVENTOR(S) : Paul A. David et al.

It is certified that error appears in the above-identified patent and that said Letters Patent is hereby corrected as shown below:

In the Specification

Column 1, Line 63, delete "that it" and replace with --that is--.

Column 1, Line 64, delete "back biased" and replace with --back-biased--.

Column 2, Line 35, delete "that it" and replace with --that is--.

Column 2, Line 36, delete "back biased" and replace with --back-biased--.

Column 3, Line 40, delete "sensor FIG. 3" and replace with --sensor of FIG. 3--.

Column 3, Line 44, delete "sensor FIG. 3" and replace with --sensor of FIG. 3--.

Column 3, Line 48, delete "sensor FIG. 3" and replace with --sensor of FIG. 3--.

Column 3, Line 49, delete "uses a two" and replace with --uses two--.

Column 3, Line 53, delete "sensor FIG. 3" and replace with --sensor of FIG. 3--.

Column 5, Line 20, delete "electronic circuit" and replace with --electronic circuits--.

Column 5, Line 29, delete "of analog" and replace with --of an analog--.

Column 5, Lines 46-47, delete "as used" and replace with --is used--.

Column 6, Line 40, delete "surfaced" and replace with --surfaces--.

Column 6, Line 48, delete "exes" and replace with --axes--.

Signed and Sealed this
Eighteenth Day of February, 2020

Andrei Iancu
*Director of the United States Patent and Trademark Office*

Column 6, Lines 48-49, delete "intersect the at" and replace with --intersect at--.

Column 6, Line 50, delete "center the" and replace with --center of the--.

Column 7, Line 14, delete "$118_z$, $118_x$, $118_z$" and replace with --$118_x$, $118_y$, $118_z$--.

Column 7, Line 17, delete "see and the" and replace with --see the--.

Column 9, Line 28, delete "then at other" and replace with --then at the other--.

Column 11, Line 14, delete "signal 518" and replace with --signal 522--.

Column 12, Line 55, delete "using a four" and replace with --using four--.

Column 14, Line 25, delete "that a both" and replace with --that both--.

Column 14, Line 38, delete "and amplified" and replace with --an amplified--.

Column 14, Line 46, delete "$109a$" and replace with --$102a$--.

Column 16, Line 14, delete "other side" and replace with --the other side--.

Column 16, Lines 31-32, delete "for different" and replace with --for a different--.

Column 16, Line 62, delete "first surface 1102" and replace with --first surface $1102a$--.

Column 16, Line 63, delete "electronic circuit" and replace with --electronic circuits--.

Column 17, Line 14, delete "thirty-two" and replace with --sixty-four--.

Column 17, Line 27, delete "with patent" and replace with --which patent--.